US011903496B2

(12) United States Patent
Glogowski et al.

(10) Patent No.: US 11,903,496 B2
(45) Date of Patent: Feb. 20, 2024

(54) DISPLAY CASE FOR DISPENSING PRODUCTS

(71) Applicant: Select Design, Ltd., Burlington, VT (US)

(72) Inventors: Brian Glogowski, Fairfax, VT (US); Travis William Vogel, Shelburne, VT (US); Chen Ta Li, Lititz, PA (US); Joshua Carl Nelson, South Burlington, VT (US)

(73) Assignee: Select Design, Ltd., Burlington, VT (US)

( * ) Notice: Subject to any disclaimer, the term of this patent is extended or adjusted under 35 U.S.C. 154(b) by 0 days.

(21) Appl. No.: 17/974,217

(22) Filed: Oct. 26, 2022

(65) Prior Publication Data

US 2023/0131536 A1 Apr. 27, 2023

Related U.S. Application Data

(60) Provisional application No. 63/263,125, filed on Oct. 27, 2021.

(51) Int. Cl.
*A47F 1/06* (2006.01)
*B65G 1/07* (2006.01)

(52) U.S. Cl.
CPC . *A47F 1/06* (2013.01); *B65G 1/07* (2013.01)

(58) Field of Classification Search
CPC ........... G07F 11/14; G07F 11/20; G07F 11/22
USPC ................................. 221/270, 271, 276, 279
See application file for complete search history.

(56) References Cited

U.S. PATENT DOCUMENTS

| 3,861,563 | A | * | 1/1975 | Lisbin | A47F 1/06 221/279 |
| 4,828,119 | A | * | 5/1989 | Pingelton | B65G 1/07 211/59.3 |
| 5,080,258 | A | * | 1/1992 | Hinterreiter | B65D 83/0418 221/229 |
| 8,485,391 | B2 | * | 7/2013 | Vlastakis | G07G 3/003 221/9 |
| 11,064,819 | B2 | | 7/2021 | Cooper et al. | |
| 2013/0037562 | A1 | * | 2/2013 | Close | A47F 1/126 206/774 |

* cited by examiner

*Primary Examiner* — Gene O Crawford
*Assistant Examiner* — Ayodeji T Ojofeitimi
(74) *Attorney, Agent, or Firm* — Downs Rachlin Martin PLLC (57) ABSTRACT

Vertical point of purchase product display stands with spring-loaded platforms that display a vertically-stacked plurality of products for viewing and removal by customers and raise the plurality of products as top layers of the products are removed.

21 Claims, 10 Drawing Sheets

DISPLAY CASE FOR DISPENSING PRODUCTS

RELATED APPLICATION DATA

This application claims the benefit of priority of U.S. Provisional Patent Application Ser. No. 63/263,125, filed Oct. 27, 2021, and titled "Display Case For Dispensing Products," which is incorporated by reference herein in its entirety.

FIELD OF THE DISCLOSURE

The present disclosure generally relates to the field of a display cases. In particular, the present disclosure is directed to vertical point of purchase product display stands.

BACKGROUND

Vertical point of purchase product display stands provide point-of-sale solutions for merchandising stackable products in retail locations such as convenience stores, supermarkets, breweries, wineries, etc. In some examples the display stands include a spring loaded platform that is depressed when the display stand is loaded with products and that raises the stacked array of products as the top layers of the products are removed.

SUMMARY OF THE DISCLOSURE

In one implementation, the present disclosure is directed to a display stand. The display stand includes an elongate housing that defines an interior volume configured to hold a plurality of vertically-stacked products, the housing having a top end; at least one spring coupled to the housing at a location proximate the top end of the housing; and a platform moveably disposed in the interior volume and supported by the at least one spring, the platform configured to support the plurality of vertically-stacked products.

In another implementation, the present disclosure is directed to a display stand. The display stand includes an elongate housing that defines an interior volume configured to hold a plurality of vertically-stacked products, the housing having a top end and a stopper; at least one spring coupled to the housing at a location proximate the top end of the housing; and a platform moveably disposed in the interior volume and supported by the at least one spring, the platform configured to support the plurality of vertically-stacked products and come into contact with the stopper when the display stand is empty.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Aspects of the present disclosure include vertical point of purchase product display stands with spring-loaded platforms that raise a vertically stacked array of products for viewing and removal by customers as top layers of the vertically stacked array of products are removed. The platform may be supported by springs that are coupled to a top portion of a housing of the display stand so that the platform is hanging from the housing by the springs and is resiliently biased to a raised position by a pulling force generated by the springs. In some examples there are no compression springs located below the platform. In some examples the platform may include lower support structures that provide a plurality of functions, including one or more of maintaining a horizontal orientation of the platform, acting as a spring guide to enclose the springs and limit a lateral displacement of the springs, and as a stop to define a maximum displacement of the platform from a raised position when the platform is empty to thereby prevent an over-extension of the springs. In some examples the springs are variable force springs such as variable force strip springs with an end of the spring coupled to a top portion of the display stand and a coil of the spring coupled to the platform.

Figure 1:
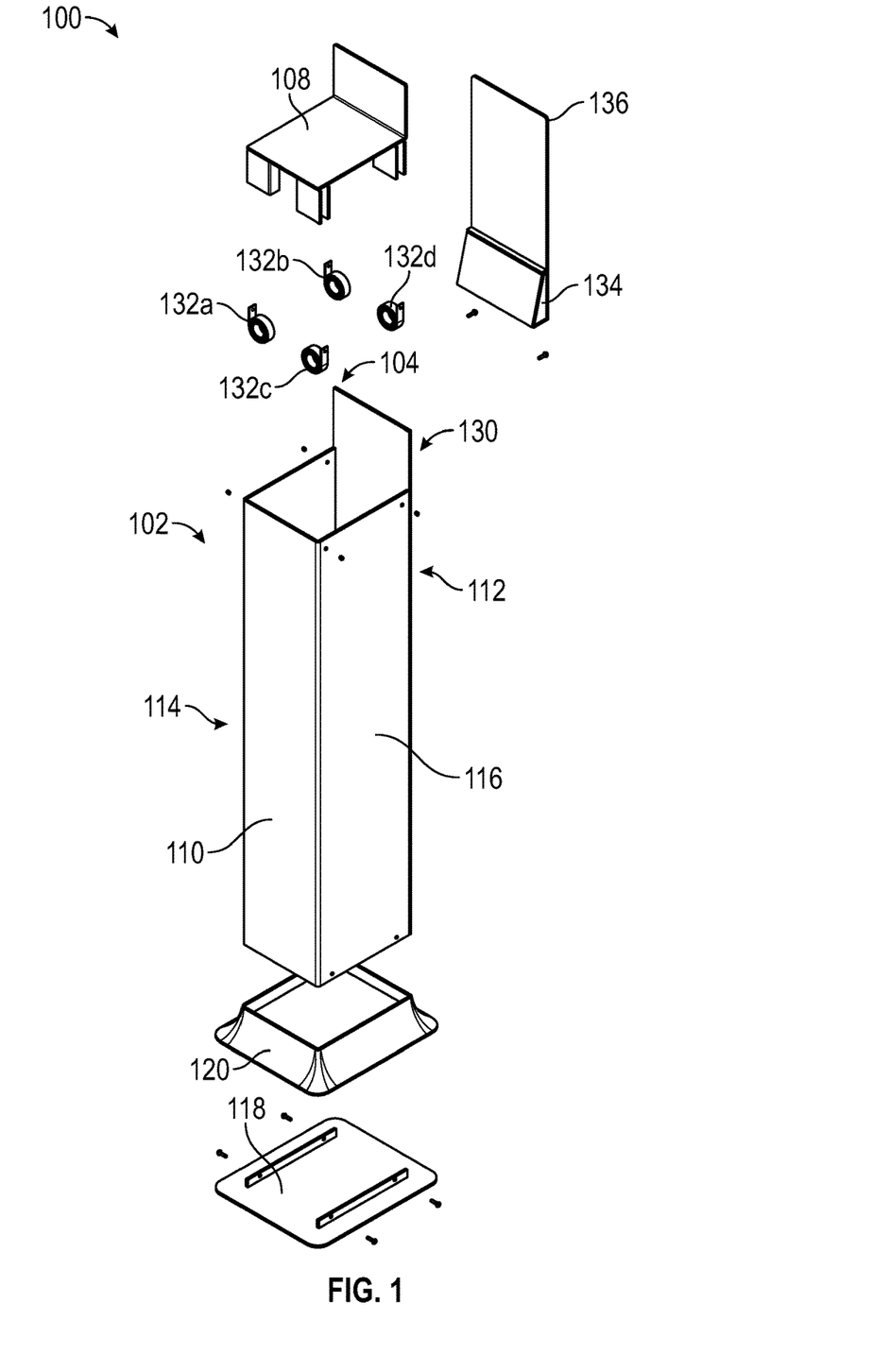
FIG. 1 is a perspective exploded view of a first example implementation of a vertical point of purchase product display stand made in accordance with the present disclosure.

FIG. 1 is a perspective exploded view of a first example implementation of a vertical point of purchase product display stand 100 made in accordance with the present disclosure. Display stand 100 includes an elongate housing 102 that defines an interior volume 104 configured to receive a plurality of vertically stacked items such as beverage multipacks 106 (e.g., FIG. 3B) for display to customers and removal by customers to purchase at a retail store. A spring-loaded platform 108 is moveably disposed in interior volume 104 for supporting the multipacks 106 or other products located on the display stand. Housing 102 includes a front wall 110, rear wall 112, and first and second side walls 114, 116. Housing 102 also includes a base 118 for supporting the walls 110-116 of the housing 102 and a skirt 120 for aesthetics and/or for structural support of the walls 110-116 on the base 118. Housing 102 can be formed out of any suitable material. In the illustrated example, walls 110-116 may be formed from a sheet material, such as a polymer such as an acrylic, wood, and/or a metal and base 118 may similarly be formed from a polymer, wood, metal, or other suitable material.

Platform 108 is resiliently biased to a raised position adjacent a top end 130 of housing 102 by a plurality of springs 132a-132d. In the illustrated example, springs 132 are variable force strip springs that are affixed to side walls 114, 116. In other examples, the number, type and location of the springs 132 may be varied, such as in the range of one to more than four springs of the same or different type such as constant force, variable force, strip, or helical compression or extension springs affixed to one or more of the walls 110-116. In some examples, platform 108 may be vertically biased by additional or alternate force mechanisms, such as one or more pneumatic cylinders and one or more electro-mechanical devices, such as a motor-driven lift system.

In the illustrated example, display stand 100 also includes a stopper 134 located on a rear portion of housing 102, and in the illustrated example, coupled to rear wall 112. In the illustrated example, stopper 134 is integrally formed with a removeable header 136 that may be used to display artwork or other advertising information for the displayed product. Header 136 and stopper 134 are configured to be removably affixed to rear wall 112. In some examples, a height of stopper 134 may be adjustable to adjust a height of the stopper according to a height of a product being displayed. As described more below, stopper 134 protrudes laterally from rear wall 112 and is designed to come into contact with a top surface of displayed products to prevent further vertical movement of the products. Stopper 134 is designed and configured to work in conjunction with springs 132 to achieve an optimum vertical movement of the displayed products when a top layer of the product is removed and platform 108 moves vertically to display the next layer of product. Stopper 134 enables an increase in a combined force generated by springs 132 so that platform 108 can move more rapidly and efficiently when raising the stacked layers of product and for maintaining the stacked layers of product in a given vertical position as customers remove products from the display.

Figures 2A, 2B:
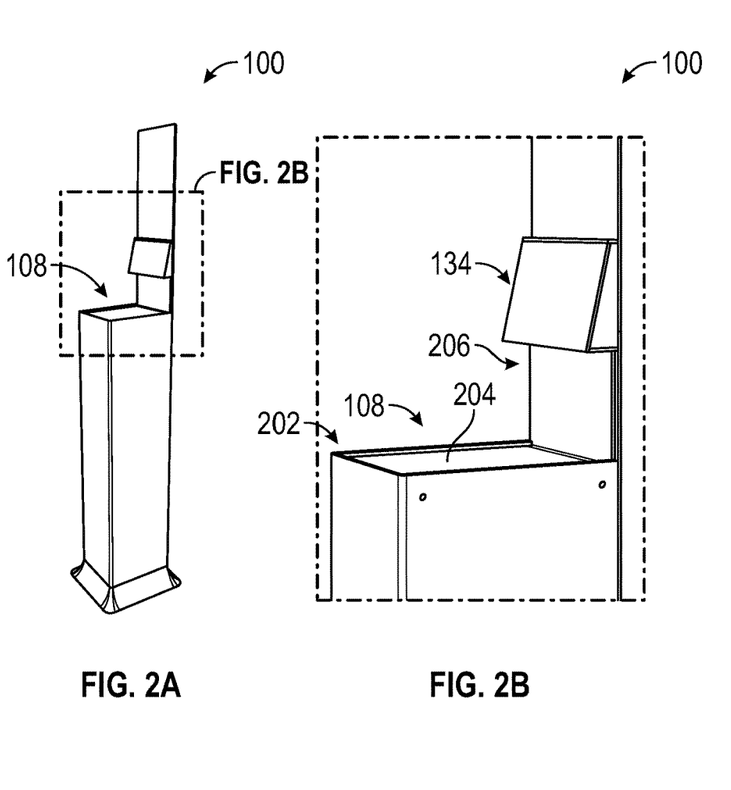
FIG. 2A is a perspective view of the display stand of FIG. 1 in an empty configuration without any products disposed on a spring-loaded platform of the display stand and a stopper engaging portion of the platform in contact with a stopper.
FIG. 2B is an enlarged perspective view of the display stand of FIG. 2A.
Figure 3A:
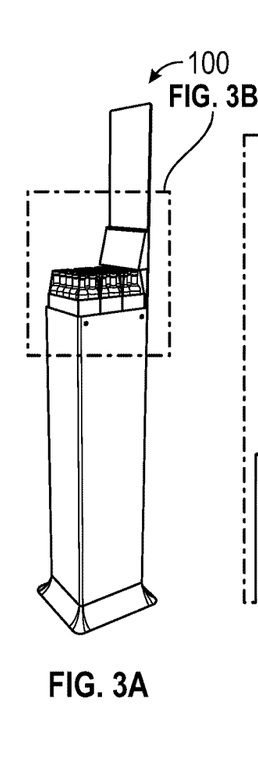
FIG. 3A is a perspective view of the display stand of FIG. 1 in a loaded configuration with a layer of products disposed on the platform and a top surface of a top layer of the products in contact with the stopper.

FIG. 2A is a side perspective view of display stand 100 without any products placed on the stand, FIG. 2B is a close-up view showing platform 108 engaged with stopper 134. FIG. 3A is a side perspective view of display stand 100 with a layer of beverage multipacks 106 loaded on platform 108 and FIG. 3B is a close-up view showing a top side of the beverage multipacks 106 engaged with stopper 134.

As shown in FIG. 2A, platform 108 is L-shaped and includes a base 202 that defines a surface 204 that is designed and configured to moveably support one or more items for display. Platform 108 also includes a stopper engaging portion 206 coupled to base 202 that is designed to contact stopper 134 when there are no products on the platform. In the illustrated example, stopper engaging portion 206 has a height that is approximately the same as a height of the displayed products, e.g., a height of a beverage multipack 106 and in some examples, slightly less than the height of the displayed products. In the illustrated example, stopper engaging portion 206 is a single element that has a width that is approximately the same as a width of base 202. In other examples, stopper engaging portion 206 may include one, or a plurality of members that each have a width that is less than a width of the base 202. In some examples, a height of stopper engaging portion 206 above base 202 may be adjustable to adjust the display for a particular height product. The height of stopper engaging portion 206 may be adjustable by changing a relative position of a top end of the stopper engaging portion relative to base 202 and/or by changing relative positions of two or more portions of the stopper engaging portion. In some examples, a height or location of stopper 134 may be adjustable to adjust the display for a particular height product. As shown in FIGS. 2A and 2B, with no product on platform 108, the top end of platform 108 contacts stopper 134. This contact retains the platform 108 within housing 102 and keeps the platform under slight compression.

Figure 3B:
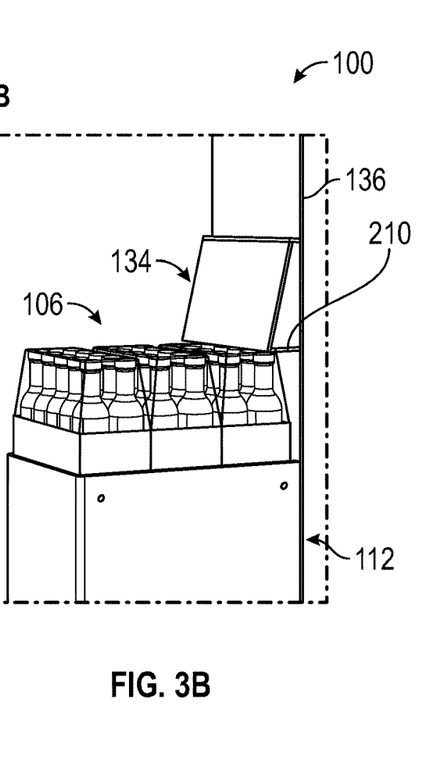
FIG. 3B is an enlarged view of the display stand of FIG. 3A.

Referring to FIGS. 3A and 3B, with products, e.g., beverage multipacks 106, on platform 108, a top side of a beverage multipack located on a rear portion of the platform contacts stopper 134. This contact keeps platform 108 and products 106 under slight compression to prevent bouncing of the platform and keep the product 106 at the same level while the top layer of product is consumed (i.e., as individual items or packs are removed from the platform). Stopper 134 defines a surface 210 that extends laterally from a rear portion, e.g., header 136 and rear wall 112 of display stand 100 by a distance sufficient to make contact with a top portion of a product placed on the platform and in contact with stopper engaging portion 206 coupled to base 202 of the platform. In some examples, a depth of surface 210 may also be adjustable to adjust a lateral distance that stopper 134 extends from header 136 so that the stopper will come into contact with a particular type of product being displayed.

Figure 4A:
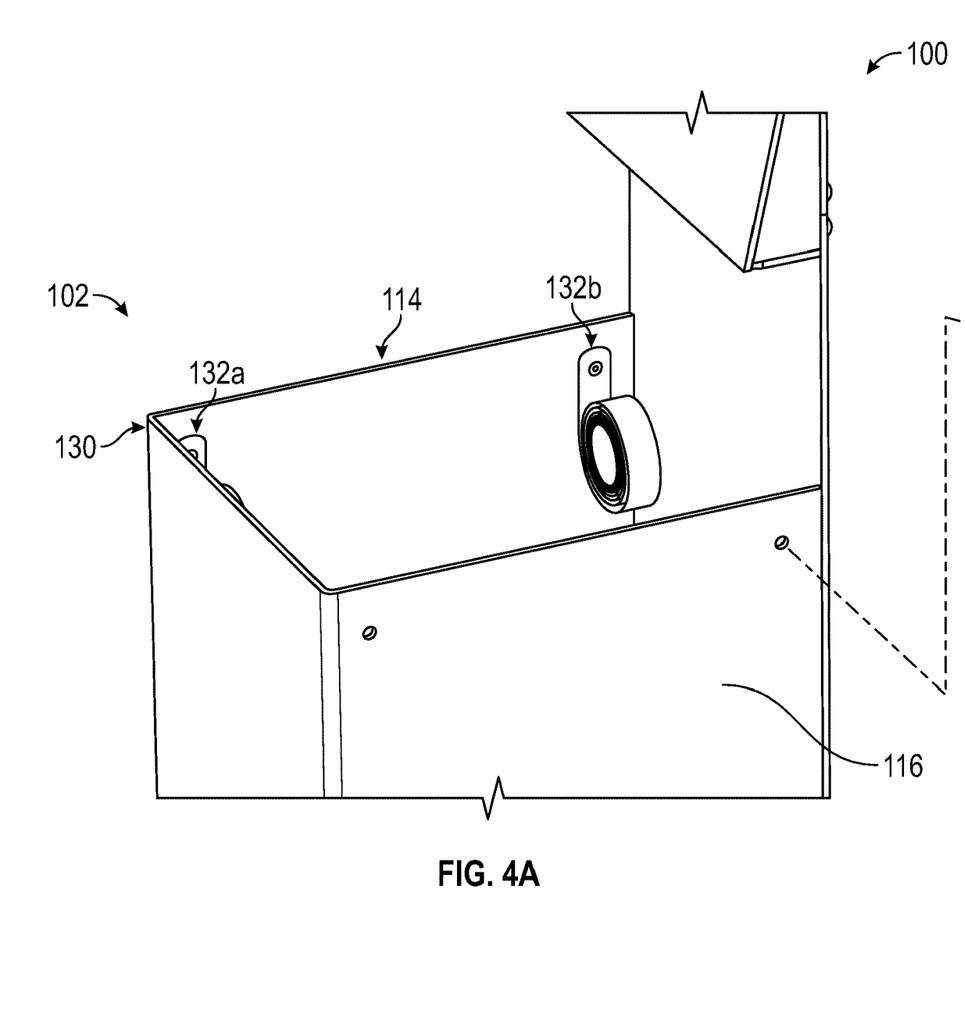
FIG. 4A is a top perspective view of the display stand of FIGS. 1-3B with the platform removed to show springs affixed to first side wall of the display stand.
Figure 4B:
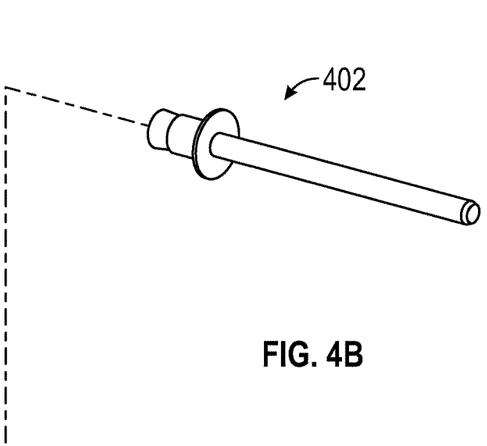
FIG. 4B is an enlarged perspective view of a rivet used to secure the spring to the wall of the display stand.

FIG. 4A is a top perspective view of display stand 100 with platform 108 removed to show springs 132a and 132b affixed to first side wall 114. In the illustrated example, springs 132 are variable force strip springs and an end of the springs are affixed to side walls 114, 116 adjacent top end 130 of housing 102. The ends of springs 132 may be directly or indirectly coupled to housing 102 by any technique known in the art. By way of non-limiting example, springs 132 may be coupled to walls 114, 116 by any combination of any of a variety of fasteners, such as rivets, screws, bolts, post screws, and/or welding. Springs 132 may also be coupled to housing 102 by other mechanical engagements, such as one or more features located on the housing having a complementary shape to features on the springs such as male or female features for sliding engagement, snap fit engagement, cam locking engagement, etc. FIG. 4B shows one non-limiting example fastener in the form of a rivet 402 for fastening springs 132 to walls 114, 116.

In the illustrated example, a plurality, e.g., four extension strip springs 132 are coupled to the platform 108 and the walls 110-116 to resiliently bias the platform to a raised position. Each strip spring 132 includes a coiled strip of spring metal that forms a coil having a central axis that is perpendicular to the direction of movement of the platform 108, here a vertical movement. An end of the spring is fixed to one of the walls (110-116) of housing 102 at a location adjacent a top end 130 of interior volume 104 and adjacent the platform when the platform is in a fully retracted position, also referred to herein as an empty position. The coil of each spring 132 is rotatably coupled to the platform 108 and is configured to both rotate and extend as the platform is depressed towards the fully extended position.

In some examples, springs 132 may be different lengths or have different force profiles or ratings. For example, springs 132a and 132c, which are located adjacent front wall 110 and configured to contact and support a front portion of platform 108, may have a first length and a first spring rate and be configured to generate a first spring force and springs 132b and 132d located adjacent rear wall 112 and configured to contact and support a rear portion of platform 108, may have a second length that is different than the first length, a second spring rate that is different than the first spring rate and/or be configured to generate a second spring force that is different than the first spring force. In an example the front springs (springs 132a and 132c) are longer and generate a smaller spring force for a given amount of displacement than the rear springs (132b and 132d). Locating longer springs under the front portion of platform 108 can help keep the platform level and prevent the front of the platform from tipping up due to the interaction of stopper 134 and a top layer of products, e.g., beverage multipacks 106, or stopper engaging portion 206. More generally, in the illustrated example stopper 134 has a spatial distribution that is asymmetrical (e.g., the stopper is only located on a rear side of housing 102) or not otherwise evenly distributed around a top portion of the housing. Springs 132 have a corresponding spatial distribution that provides a corresponding asymmetric force distribution around platform 108, the asymmetric spring force distribution cooperating with stopper 134 to maintain the platform in a substantially horizontal orientation. In other examples, each of springs 132 may be the same and/or may have the same length. In some examples, each of springs 132 may be the same and the display case may have a stopper with portions located on both the front and rear sides of the housing for engagement with the front and rear sides of the platform or products located on the platform, and/or on any two sides, any three sides or on all sides of the housing for engagement with a corresponding two, three or four sides of displayed products and/or the platform.

Figure 5A:
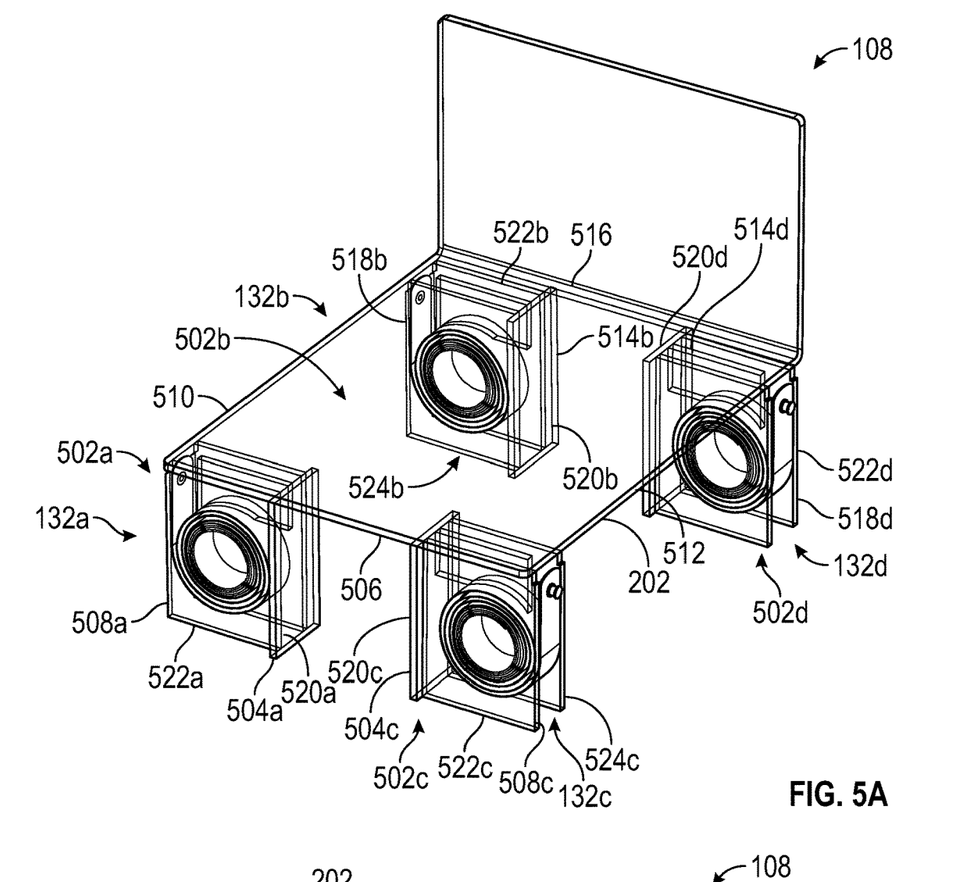
FIG. 5A is a perspective view of the platform and springs of the display stand of FIG. 1.
Figure 5B:
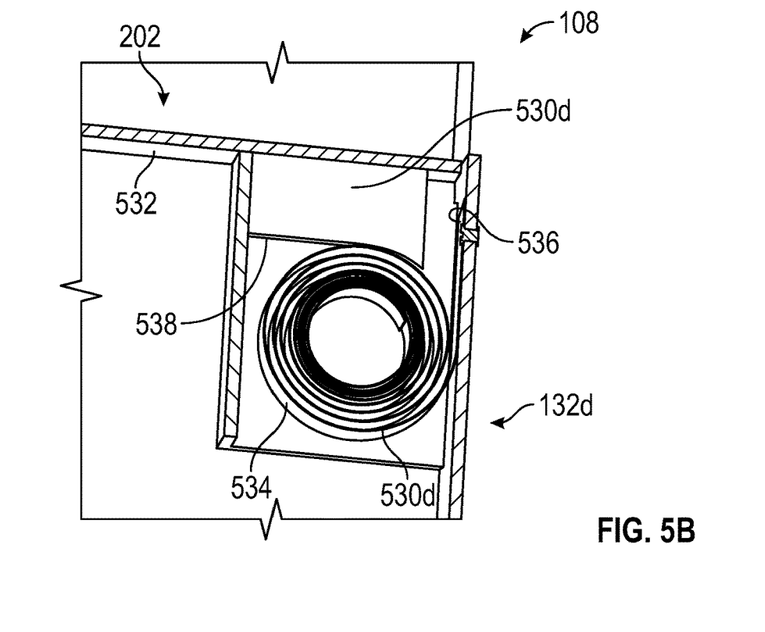
FIG. 5B is an enlarged cross sectional view of the display stand of FIG. 1 showing a spring operably coupled to the housing and platform.

FIG. 5A is a top perspective view of platform 108 and springs 132 with the platform illustrated as semitransparent to illustrate the springs. FIG. 5B is a partial cross sectional view of platform 108 and housing 102 showing spring 132d operably coupled to the platform and housing.

As shown in FIG. 5A, platform 108 includes a lower support structure 502 that includes portions 502a-502d coupled to a lower surface of base 202 of the platform adjacent the four corners of the base. Support structures 502a and 502c located in a front portion of platform 108 include front edges 504a, 504c that are aligned with a front edge 506 of platform 108 and side edges 508a, 508c that are aligned with side edges 510, 512 of the platform. Support structures 502b and 502d located in a rear portion of platform 108 include rear edges 514b, 514d that are aligned with a rear edge 516 of platform 108 and side edges 518b, 518d that are aligned with side edges 510, 512 of the platform. By locating outer portions (edges 504, 508, 514, 518) of support structures 502 in substantial alignment with an outer extent of platform 108 (edges 506, 510, 512, 516), the support structures are configured, dimensioned and located to be in sliding engagement with inner surfaces of walls 110-116 of housing and act as supports that maintain platform 108 in a horizontal orientation as the platform moves within the housing, thereby preventing the platform from tipping forward, backward, or side to side. The friction between the outer edges of the support structures 502 and walls 110-116 also provide dampening to smooth the movement of the platform.

In the illustrated example, each of support structures 502a-502d include a first member 520a-520d that defines front edges 504 or rear edges 516 and a second member 522a-522d that define side edges 508. First member 520 and second member 522 are non-parallel and in the illustrated example are substantially orthogonal forming a T-shaped support structure. In other examples, platforms made in accordance with the present disclosure may have additional or fewer support structures located in the same or different locations on the base of the platform. For example, the support structures may be located at midpoints along one or more of edges 506, 510, 512, 516 of the platform rather than located at the corners of the platform. And each support structure may have only one edge that comes into contact with a wall of housing 102 rather than two or more edges.

In the illustrated example, support structures 502 are also designed and configured as spring guides and are positioned adjacent corresponding ones of spring 132. Each support structure 502 includes a third member 524a-524d (only 524c and 524b labeled) that are substantially parallel to corresponding ones of second members 522a-522d, the first, second, and third members cooperating to define interior volumes 530a-530d where springs 132 are rotatably disposed. In other examples, support structures may only include one or two members instead of three members with the one or two members acting as a spring guide, in some examples in cooperation with one or more of walls 110-116 of housing 102.

As shown in FIG. 5B, in the illustrated example, platform 108 also includes spring supports 530a-530d (530d shown in FIG. 5B) that are affixed to lower surface 532 of base 202 and that are configured to engage and support corresponding ones of springs 132. Spring supports 530 extend from base 202 and maintain a distance between a coil 534 of a corresponding one of the springs 132 and an end 536 of the spring. Each spring support 530 has a spring-guiding surface 538 that a corresponding spring 132 is designed to be in sliding engagement with. As weight is added to platform 108, the increased weight creates a downward force that causes the spring coil 534 to unwind. An outer surface of the spring coil 534 is in sliding engagement with spring guiding surface 538. A material type and roughness of either the spring material and/or the spring guiding surface 538 may be selected for a desired coefficient of friction between the spring and the spring guiding surface for controlling a dampening of the movement of platform 108. In other examples, the spring guide or support may include a shaft or drum (not illustrated) that coil 534 of the strip spring is rotatably disposed on or that rotates with the spring coil. In the illustrated example, support structures 502 do not include such a shaft or drum and spring coil 534 is free floating, with the upward force of the spring forcing the spring coil 534 against spring guiding surface 538. In the illustrated example, spring guiding surface 538 has a curvature that is designed and configured to cradle spring 132 and maintain spring coil 534 at a desired offset from the walls of housing 102.

Figure 6A:
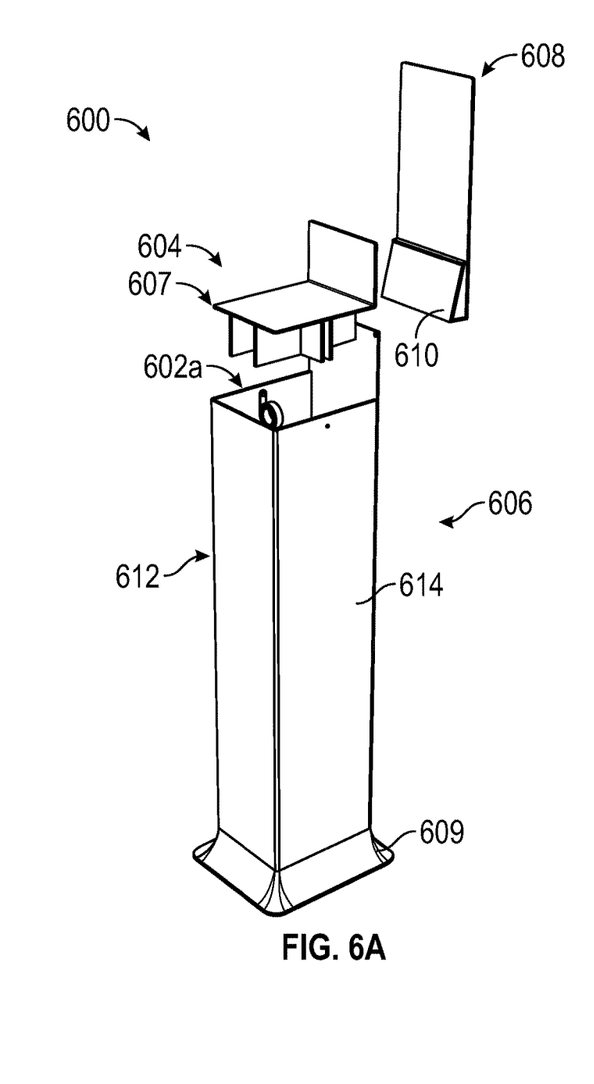
FIG. 6A is a perspective exploded view of another example implementation of a vertical point of purchase product display stand made in accordance with the present disclosure.

FIG. 6A is a perspective exploded view of another example of a display stand 600 made in accordance with the present disclosure. Display stand 600 is similar to display stand 100 (FIGS. 1-5B) except that display stand 600 utilizes only two strip springs 602a, 602b (only 602a visible in FIG. 6A) rather than four. Display stand 600 includes a platform 604 that includes alternate support structures 607 located on a bottom side of the platform for supporting the platform and guiding the springs. As shown in FIG. 6A, display stand 600 includes a housing 606 supported by a base 609 and platform 604 is slidably disposed in the housing and resiliently biased to a raised location by springs 602. Platform 604 is designed and configured to support a plurality of vertically stacked items such as beverage multipacks 106 (e.g., FIG. 3B) for display to customers and removal by customers to purchase at a retail store. Display stand 600 also includes a removeable header 608 and a stopper 610 affixed to the removeable header that provides the same functions as stopper 134 (FIG. 1). Ends of springs 602a and 602b are affixed to side walls 612, 614 of housing 606 and the coils of the springs are designed to come into contact with a bottom side of platform 604 to apply an upward vertical force to the platform. In the illustrated example, springs 602 are attached at midpoints of the respective sidewalls 612, 614. In other examples, the springs 602 could be attached at other locations on the side walls or to front wall 616 and rear wall 618. Platform 600 may also include additional springs, including either strip springs or helical springs to provide additional support.

Figure 6B:
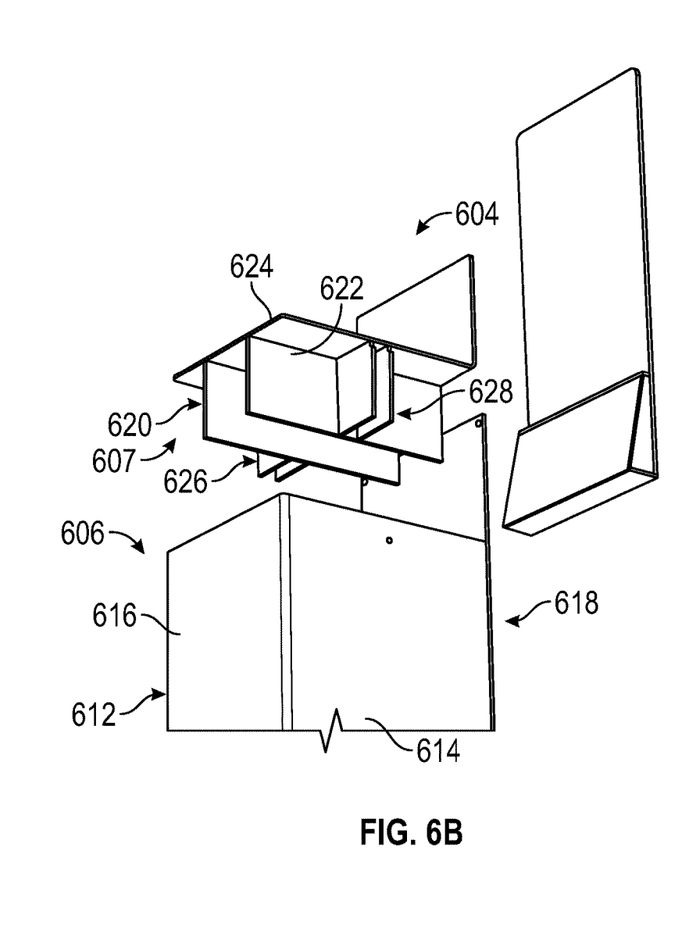
FIG. 6B is an enlarged perspective exploded view of the display stand of FIG. 6A.

FIG. 6B is a bottom perspective exploded view of display stand 600 illustrating support structures 607. In the illustrated example support structures 607 include two plates 620, 622 that are oriented in a forward-aft direction and have a length that is substantially the same as a depth of a base 624 of platform 604 with front edges and rear edges of the plates aligned with an outer extent of the base of the platform for sliding engagement with front wall 616 and rear wall 618 of housing 606. Support structures 607 also include two pairs 626, 628 of plates that are positioned at opposite sides of base 624 for sliding engagement with side walls 612, 614 of housing 606. By locating outer portions of support structures 607 in substantial alignment with an outer extent of platform 604, the support structures are configured, dimensioned and located to be in sliding engagement with inner surfaces of the walls of housing 606 and act as supports that maintain the platform in a horizontal orientation as the platform moves within the housing, thereby preventing the platform from tipping forward, backward, or side to side. The friction between the outer edges of the support structures 607 and walls 612, 614, 616, 618 also provide dampening to smooth the movement of the platform.

In the illustrated example, pairs 626, 628 of plates are also designed and configured as spring guides and are positioned on opposite sides of corresponding ones of springs 602 to maintain the spring in a substantially vertical orientation and prevent excessive lateral movement of the spring.

Figure 7A:
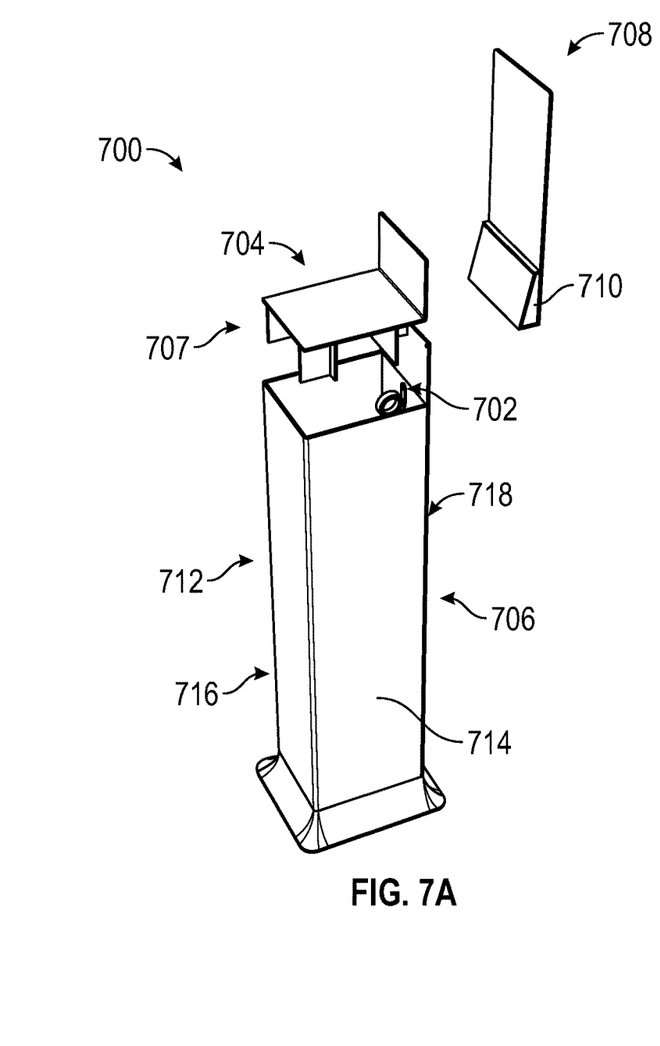
FIG. 7A is a perspective exploded view of another example implementation of a vertical point of purchase product display stand made in accordance with the present disclosure.

FIG. 7A is a top perspective exploded view of another example of a display stand 700 made in accordance with the present disclosure. Display stand 700 is similar to display stands 100 (FIGS. 1-5B) and 600 (FIGS. 6A, 6B) except that display stand 700 utilizes only one strip spring 702 rather than two or four. Display stand 700 includes a platform 704 that includes support structures 707 located on a bottom side of the platform for supporting the platform and guiding the spring. As shown in FIG. 7A, display stand 700 includes a housing 706 and platform 704 slidably disposed in the housing and resiliently biased to a raised location by spring 702. Platform 704 is designed and configured to support a plurality of vertically stacked items such as beverage multipacks 106 (e.g., FIG. 3B) for display to customers and removal by customers to purchase at a retail store. Display stand 700 also includes a removeable header 708 and a stopper 710 affixed to the removeable header that provides the same functions as stopper 132 (FIG. 1). An end of spring 702 is affixed to a rear wall 718 of housing 706 and the coil of the spring is designed to come into contact with a bottom side of platform 704 to apply an upward vertical force to the platform. In the illustrated example, spring 702 is attached at a midpoint of rear wall 718. In other examples, the spring 702 could be attached at other locations on rear wall 718 or attached to one of the other walls 712, 714, or 716. Display stand 700 may also include additional springs, including either strip springs or helical springs to provide additional support.

Figure 7B:
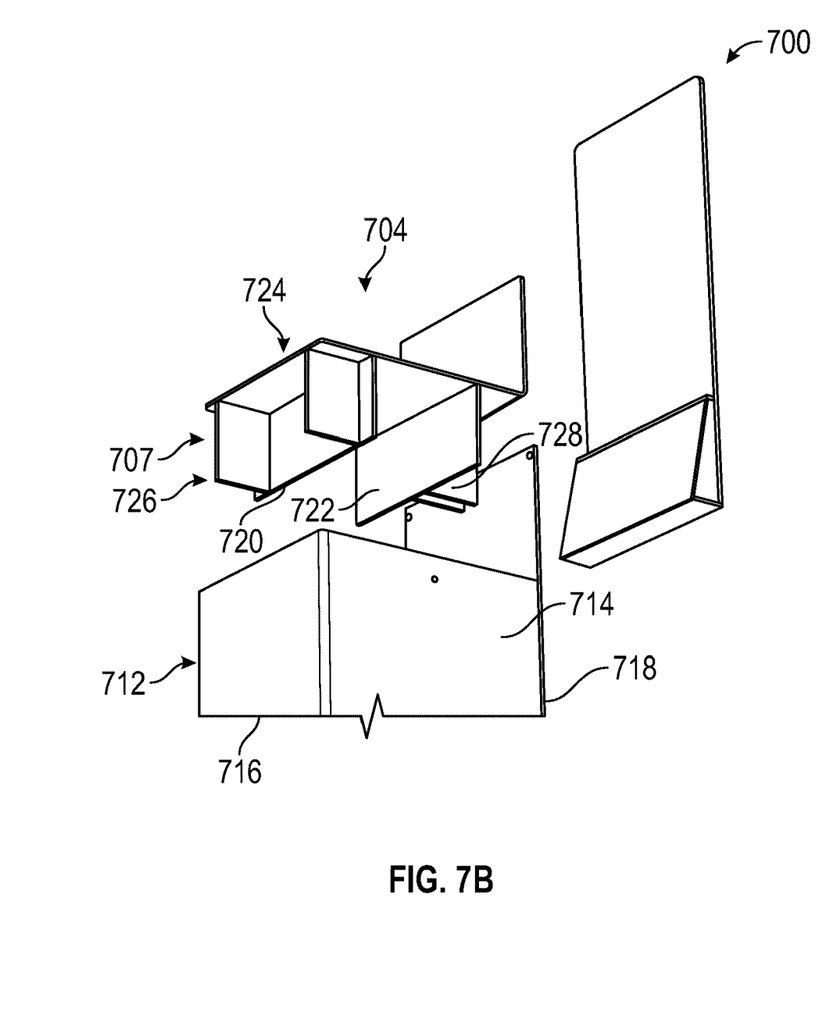
FIG. 7B is an enlarged perspective exploded view of the display stand of FIG. 7A.
Figures 8A, 8B, 8C, 8D, 8E, 8F:
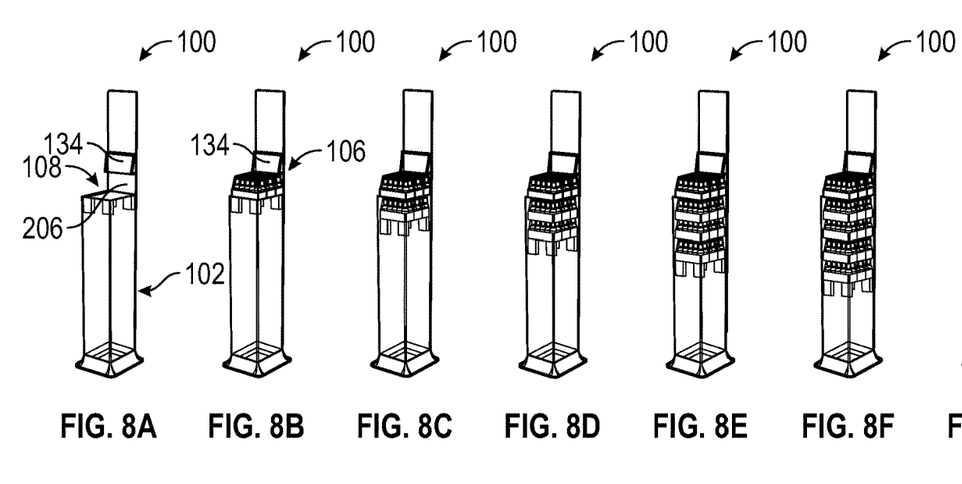
FIGS. 8A-8I are perspective views of the display stand of FIG. 1 showing the display stand in use.
Figures 8G, 8H, 8I:
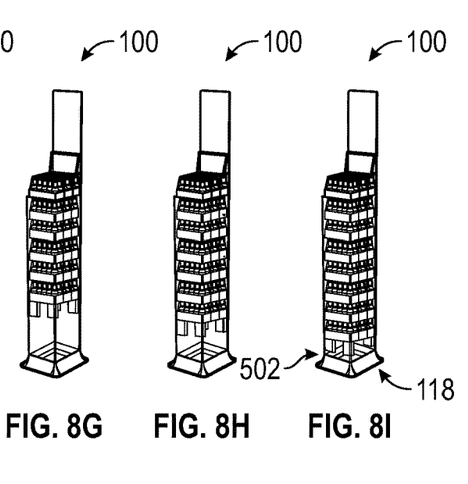

FIG. 7B is a bottom perspective exploded view of display stand 700 illustrating support structures 707. In the illustrated example, support structures 707 include two plates 720, 722 that are oriented in a side to side direction and have a length that is substantially the same as a width of a base 724 of platform 704 with front edges and rear edges of the plates aligned with an outer extent of the base of the platform for sliding engagement with side walls 712 and 714. Support structures 707 also include two pairs 726, 728 of plates that are positioned at opposite sides of base 624 for sliding engagement with front wall 716 and rear wall 718. By locating outer portions of support structures 707 in substantial alignment with an outer extent of platform 704, the support structures are configured, dimensioned and located to be in sliding engagement with inner surfaces of the walls of housing 706 and act as supports that maintain the platform in a horizontal orientation as the platform moves within the housing, thereby preventing the platform from tipping forward, backward, or side to side. The friction between the outer edges of the support structures 707 and walls 712, 714, 716, 718 also provide dampening to smooth the movement of the platform.

In the illustrated example, pair 728 of plates is also designed and configured as spring guide and is positioned with plates on opposite sides of spring 702 to maintain the spring in a substantially vertical orientation and prevent excessive lateral movement of the spring.

FIGS. 8A-8I are a series of perspective views of display stand 100 in use with housing 102 shown as semi-transparent in order to illustrate the functionality of the display stand. The illustrated example is designed to hold a stack of twenty-four 10-packs of 50 ml beverage bottles stacked with three 10-packs per layer and a total of eight layers. As will be appreciated, this specific example is provided for illustrative purposes only and display stands made in accordance with the present disclosure can be adapted to hold any of a variety of products in a vertically stacked orientation.

As shown in FIGS. 8B-8I, the rear beverage pack in the topmost layer of beverage packs 106 bumps against the underside of stopper 134 to hold the top layer of the product stack in a display position so that one or more packs 106 can be readily viewed and removed by a customer. Springs 132 (see FIG. 1) are designed so that the pressure applied by the beverage pack 106 against stopper 134 is relatively small but sufficient to eliminate bouncing of the stack of products and also making it easy to remove the product. For example, the force exerted by springs 132 between the top layer of packs 106 and stopper 134 may be in the range of 1% to 10% greater than a total weight of products being displayed, such as the weight of three 10-packs of 50 ml bottles of liquid in the illustrated example. Comparing, e.g., FIG. 8I and FIG. 8H, when a top layer of packs 106 is removed fully, springs 132 raises the stack of packs 106 to show the next layer of beverage packs in the same position, with the upward movement stopping when the next layer of packs comes into contact with stopper 134. As shown in FIG. 8A, when the display stand is empty and no beverage packs are located on platform 108, the top edge of the stopper engaging portion 206 of the platform stops against the underside of stopper 134.

As noted above, in the example shown in FIG. 1, springs 132a-132d are variable force springs such that they are easier to extend at first but become harder to extend the farther they are extended. In one example, the total spring rate from the assembly of springs 132 is designed and selected according to a weight and height of the product to be displayed such that when one layer of product is positioned on the display, the spring force is greater than or equal to the weight of the one layer, when it is extended by a first distance, and when a second layer is added, the spring force is greater than or equal to the weight of the two layers when it is extended by the first distance plus a height of one layer of the product, and so on. In other examples, constant force springs may be used.

In some examples, when display stand 100 is fully loaded a bottom end of platform 108, e.g., a bottom edge of support structure 502 (FIG. 5) is designed to come into contact with base 118, which prevents the over-extension of springs 132. Thus, a height of support structures 502 can be designed and configured to define a maximum distance platform 108 is able to be depressed down into housing 102. For example, a height of interior volume 104 minus a height of support structures 502 may be configured to be approximately less than a maximum allowable extension distance of one or more of springs 132 (taking into account adjustments for the specific location within the housing where the spring is attached relative to a top end of the housing). In other examples, instead of or in addition to utilizing support structure 502 as a stop, stops may be located on inner surfaces of one or more of walls 110-116 that are designed to come into contact with platform 108 to prevent the platform from being depressed beyond a maximum distance.

Figure 9A:
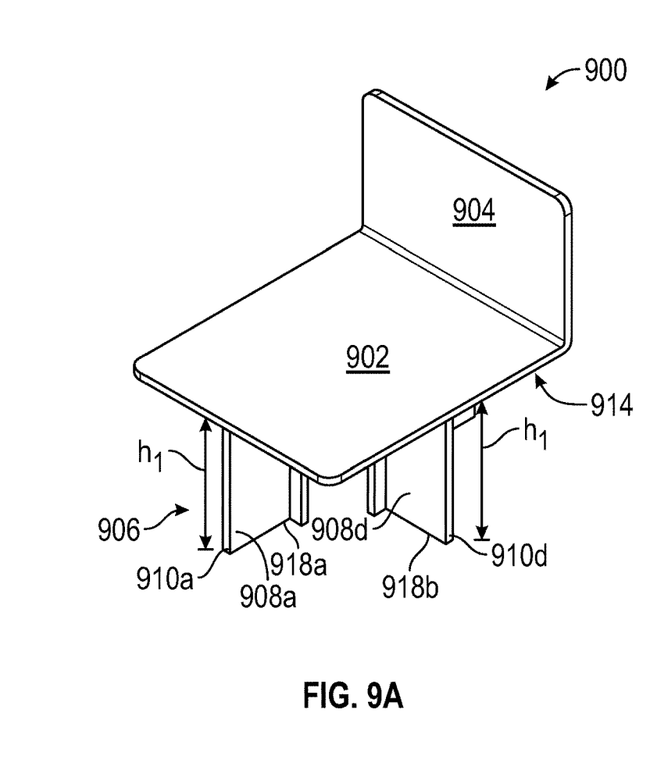
FIG. 9A is a perspective view of a platform.
Figure 9B:
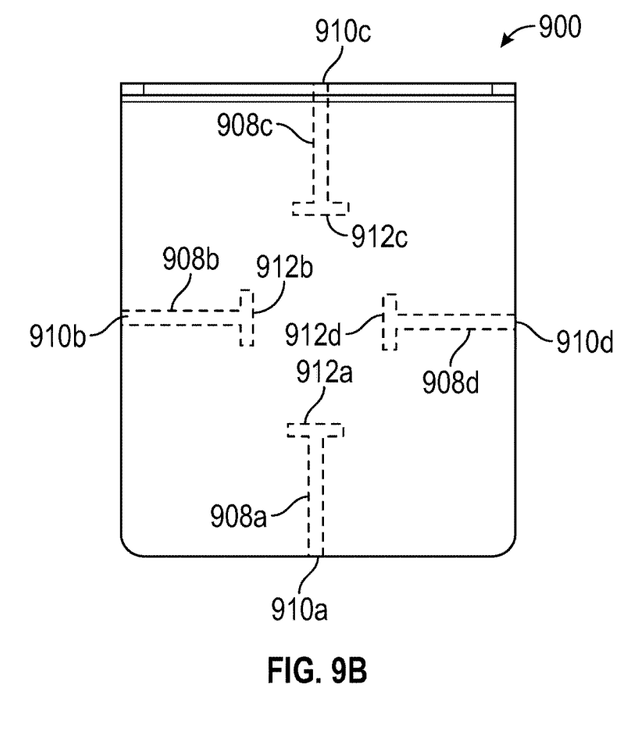
FIG. 9B is a top view of the platform of FIG. 9A.

FIGS. 9A and 9B illustrate another example embodiment of a platform 900 that may be used with any of the display stands disclosed herein. FIG. 9A is a perspective view and FIG. 9B is a top view. Platform 900 is similar to platforms 108 (FIG. 1), platform 600 (FIG. 6A) and platform 700 (FIG. 7A), including a base 902 that has a shape and dimension that are configured to be complementary to a shape and dimension of a housing of a display stand, such as housing 102 and a stopper engaging portion 904 extending from a rear side of base 902 for engaging a stopper such as stopper 134 of display stand 100 (FIG. 1). Platform 900 has a lower support structure 906 that includes four plates 908a-908d that each have an outer edge 910a-910d aligned with an outer extent of base 902 and designed to come into sliding contact with inner surfaces of the walls of a housing such as housing 102 and act as supports that maintain platform 900 in a horizontal orientation as the platform moves within the housing, thereby preventing the platform from tipping forward, backward, or side to side. The friction between the outer edges 910 of the support structure 906 and walls of the housing also provide dampening to smooth the movement of the platform. Each of plates 908 are located at a midpoint of a corresponding edge of base 902. Support structure 906 also includes reinforcing members 912a-912d coupled to corresponding ones of plates 908 for reinforcing the plates.

In the illustrated example, platform 900 does not include spring supports coupled to a bottom side 914 of base 902 (such as spring supports 530 (FIG. 5B)) and the platform is designed for the coils of springs, such as springs 132 to come into direct contact with bottom side 914 of base 902. Each of plates 908 also act as spring guides, in cooperation with the walls of a housing, such as housing 102, preventing excess lateral movement of the coils of the springs and preventing adjacent springs from contacting each other. As will be appreciated by persons having ordinary skill in the art, the number, location, and shape of the components of lower support structure 906 may be varied. For example, two or more plates 908 may be located along one of more of the edges of base 902 and the plates may have an alternate shape, such as triangular. Support structure 906 may also be designed and configured as a stop to define a maximum depth platform 900 is allowed to extend into a housing, with a bottom surface 918 (defined in the illustrated example by bottom ends 918a-918d of plates 908a-908d) of support structure designed to come into contact with a base of the housing at the point of maximum depth, to thereby prevent the over-extension of springs, such as springs 132. Thus, a height, h1, of support structure 906 is configured and dimensioned according to a height of a housing and a maximum extension length of springs so that the springs do not extend beyond the maximum extension length of one of more of the springs when support structure 906 contacts the base of the housing.

Figure 10A:
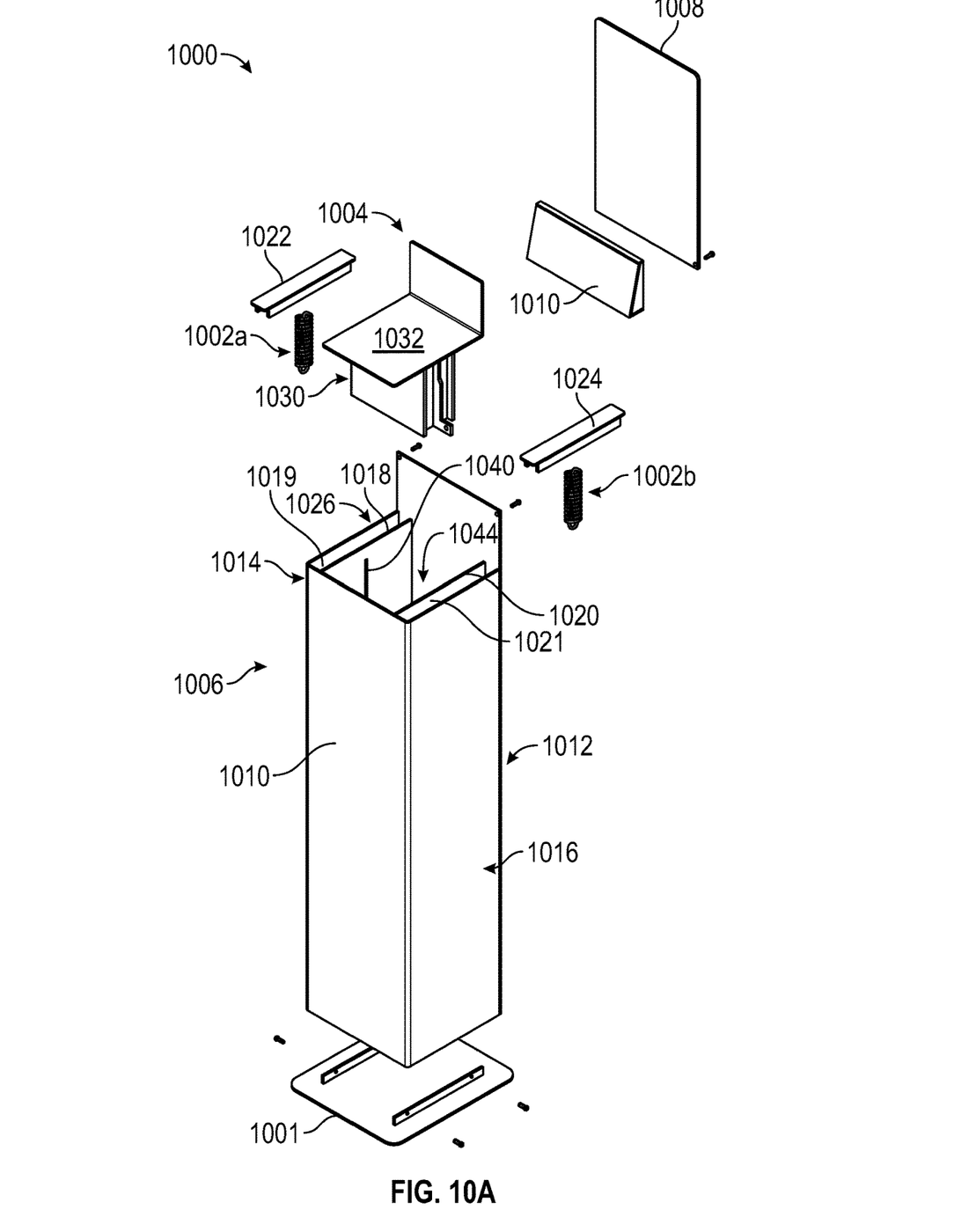
FIG. 10A is a perspective exploded view of another example implementation of a vertical point of purchase product display stand made in accordance with the present disclosure.

FIG. 10A is an exploded perspective view of an example display stand 1000 made in accordance with the present disclosure. Display stand 1000 is similar to other display stands disclosed herein, including a housing 1006 supported by a base 1001 and a platform 1004 that includes a base 1032 and a lower support structure 1030 extending from the base, the platform slidably disposed in the housing and resiliently biased to a raised location by springs 1002a, 1002b. Platform 1004 is designed and configured to support a plurality of vertically stacked items such as beverage multipacks 106 (e.g., FIG. 3B) for display to customers and removal by customers to purchase at a retail store. Display stand 1000 also includes a removeable header 1008 and a stopper 1010 affixed to the removeable header that provides the same functions as stopper 134 (FIG. 1).

Display stand 1000 has an alternate helical spring configuration that includes first and second helical extension springs 1002a and 1002b. Housing 1006 includes a front wall 1010, rear wall 1012, and first and second side walls 1014, 1016. Housing 1006 also includes first and second interior walls 1018, 1020 that are parallel to first and second side walls 1014, 1016 and that define corresponding spring cavities 1019, 1021 where springs 1002a, 1002b are disposed. Outer walls 1010-1016 of housing 1006 define an interior volume and the two interior walls 1018, 1020 act as partitions that divide the interior volume into the two spring cavities 1019, 1021 where extension springs 1002 are located and one central platform volume 1044 where platform 1004 is slidably disposed.

Housing 1006 also includes spring mounts 1022, 1024 that are configured and dimensioned to be located at a top end 1026 of the housing and enclose the top end of spring cavities 1019, 1021 and provide a mount for springs 1002a, 1002b to be secured to and hang from. In the illustrated example, there is only one spring 1002 on each side of platform 1004. In other examples, a plurality of springs may be coupled to two or more sides of the platform.

Figure 10B:
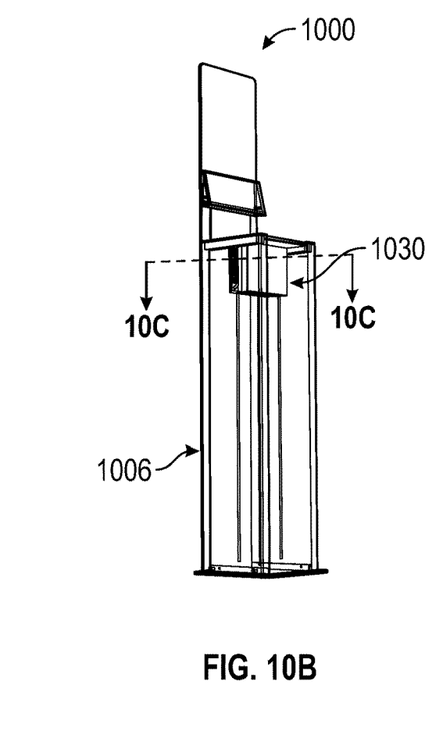
FIG. 10B is a perspective view of the display stand of FIG. 10A.
Figure 10C:
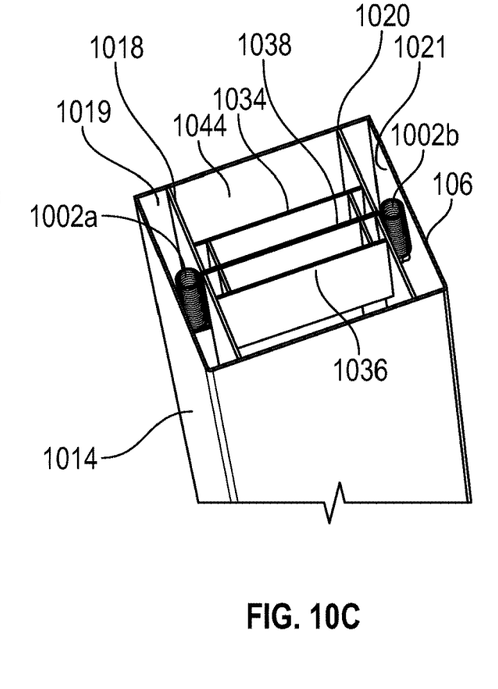
FIG. 10C is a cross sectional view of the display stand of FIG. 10A.
Figure 10D:
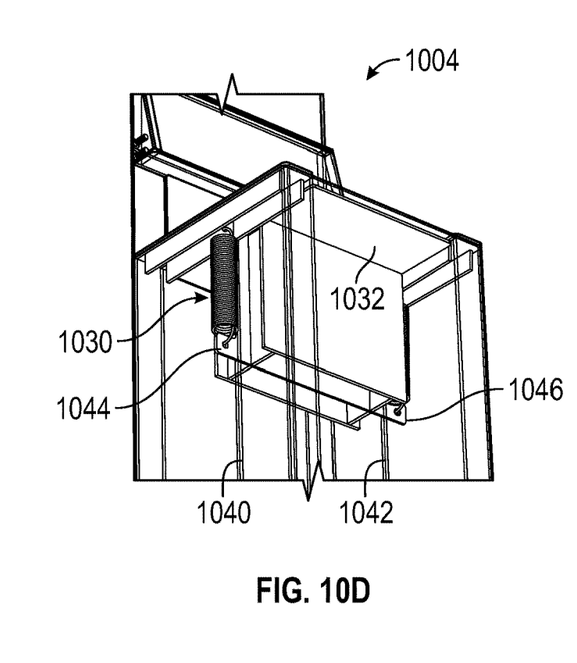
FIG. 10D is an enlarged perspective view of the display stand of FIG. 10A.

FIG. 10B is a perspective view of display stand 1000 with housing 1006 shown as partially transparent to illustrate internal components of the display stand. FIG. 10C is a top perspective cross sectional view of display stand 1000 the section taken below base 1032 and illustrating lower support structure 1030 and springs 1002 in housing 1006. FIG. 10D is a lower perspective view of display stand 1000 with housing shown as partially transparent. FIGS. 10C and 10D show lower support structure 1030 of platform 1004 that extends from a lower side of base 1032 of the platform. Support structure 1030 includes three parallel plates including outer plates 1034, 1036, and a middle plate 1038. Outer plates 1034 and 1036 have a first length and are designed to be located between interior walls 1018, 1020 and be in sliding contact with the interior walls to support platform 1004 and maintain the platform in a horizontal position during movement of the platform. At least a portion of middle plate 1038 has a length that is greater than the length of outer plates 1034, 1036 and is configured to extend through longitudinal slots 1040, 1042 in interior walls 1018, 1020 and include spring anchors 1044, 1046 that couple to lower ends of springs 1002a, 1002b to thereby hang platform 1004 from the springs. Middle plate 1038 also cooperates with slots 1040, 1042 to provide structural support for platform 1004, preventing tilting of the platform in a front-back direction.

The foregoing has been a detailed description of illustrative embodiments of the disclosure. It is noted that in the present specification and claims appended hereto, conjunctive language such as is used in the phrases "at least one of X, Y, and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A display stand, comprising:
an elongate housing that defines an interior volume configured to hold a vertically-stacked plurality of products, the housing having a top end;
at least one spring coupled to the housing at a location proximate the top end of the housing; and
a platform moveably disposed in the interior volume and supported by the at least one spring, the platform configured to support the plurality of products;
wherein the platform includes a base configured to receive and support the plurality of products, wherein the base has opposed top and bottom sides and a lower support structure extending from the bottom side of the base, the lower support structure configured to contact a wall of the housing to maintain the base in a substantially horizontal orientation; and
wherein the at least one spring includes at least one front spring located adjacent a front side of the platform and at least one rear spring located adjacent a rear side of the platform, wherein the front and rear springs have different spring rates and/or different lengths.

2. The display stand of claim 1, wherein the at least one front spring is longer than the at least one rear spring and/or the at least one rear spring generates a greater spring force than the at least one front spring for a given displacement.

3. The display stand of claim 1, wherein the at least one spring is a variable force spring.

4. The display stand of claim 1, wherein the at least one spring is a strip spring that includes an end and a coil, wherein the end is coupled to the housing and the coil is coupled to the platform.

5. The display stand of claim 1, wherein the at least one spring is configured to control a position of the platform in the interior volume so that a top layer of the vertically-stacked plurality of products is located at the top end of the housing to be viewed and removed by a customer and automatically raise the platform when an uppermost layer of the products is removed.

6. The display stand of claim 1, wherein the lower support structure is configured as a spring guide that limits a lateral movement of the at least one spring.

7. The display stand of claim 6, wherein the lower support structure is configured as a stop that comes into contact with a lower portion of the housing to define a maximum distance the platform can be depressed into the housing.

8. The display stand of claim 1, wherein a first end of the at least one spring is coupled to the housing and a second opposite end of the at least one spring is coupled to the lower support structure.

9. The display stand of claim 8, wherein the at least one spring is a helical extension spring.

10. The display stand of claim 8, wherein the housing includes a first wall and at least one interior wall, the first wall and a first side of the at least one interior wall defining a spring cavity where the at least one spring is disposed, wherein a second side of the at least one interior wall defines a platform volume where the platform is moveably disposed.

11. The display stand of claim 1, wherein the housing includes a stopper located proximate the top end of the housing, the stopper configured to contact a top surface of a top layer of the plurality of vertically-stacked products to maintain a height of the top layer.

12. The display stand of claim 11, wherein the stopper and the at least one spring cooperate to apply a compressive force to the plurality of vertically-stacked products.

13. The display stand of claim 11, wherein the platform includes a stopper-engaging portion that contacts the stopper when the display stand is empty.

14. The display stand of claim 4, wherein the coil is in sliding contact with a lower surface of the platform.

15. The display stand of claim 4, wherein the coil is rotatably coupled to the platform.

16. A display stand, comprising:
an elongate housing that defines an interior volume configured to hold a vertically-stacked plurality of products, the housing having a top end;
at least one spring coupled to the housing at a location proximate the top end of the housing; and
a platform moveably disposed in the interior volume and supported by the at least one spring, the platform configured to support the plurality of products;
wherein the housing includes a stopper located proximate the top end of the housing, the stopper configured to contact a top surface of a top layer of the plurality of products to maintain a height of the top layer;
wherein the stopper and the at least one spring cooperate to apply a compressive force to the plurality of products; and
wherein the at least one spring includes at least one front spring adjacent a front side of the platform and at least one rear spring adjacent a rear side of the platform, wherein the front and rear springs have different spring rates and/or different lengths for maintaining the platform in a substantially horizonal orientation.

17. The display stand of claim 16, wherein the platform includes a lower support structure configured as a stop that comes into contact with a lower portion of the housing to define a maximum distance the platform can be depressed into the housing.

18. The display stand of claim 16, wherein the at least one spring includes at least two variable force strip springs.

19. A display stand, comprising:
an elongate housing that defines an interior volume configured to hold a vertically-stacked plurality of products, the housing having a top end;
at least one spring coupled to the housing at a location proximate the top end of the housing; and
a platform moveably disposed in the interior volume and supported by the at least one spring, the platform configured to support the plurality of products;
wherein the housing includes a stopper located proximate the top end of the housing, the stopper configured to contact a top surface of a top layer of the plurality of products to maintain a height of the top layer;
wherein the platform includes a stopper-engaging portion that contacts the stopper when the display stand is empty; and
wherein the at least one spring includes at least one front spring adjacent a front side of the platform and at least one rear spring adjacent a rear side of the platform, wherein the front and rear springs have different spring rates and/or different lengths for maintaining the platform in a substantially horizonal orientation.

20. The display stand of claim 19, wherein the platform includes a lower support structure configured as a stop that comes into contact with a lower portion of the housing to define a maximum distance the platform can be depressed into the housing.

21. The display stand of claim 19, wherein the at least one spring includes at least two variable force strip springs.

* * * * *